(12) United States Patent
Lee et al.

(10) Patent No.: US 12,529,728 B2
(45) Date of Patent: Jan. 20, 2026

(54) APPARATUS FOR CORRECTING STATE OF CHARGE OF LOW-VOLTAGE BATTERY IN VEHICLE AND METHOD FOR THE SAME

(71) Applicants: HYUNDAI MOTOR COMPANY, Seoul (KR); Kia Corporation, Seoul (KR)

(72) Inventors: Jung Hun Lee, Seoul (KR); Chang Ryeol Yoo, Incheon (KR)

(73) Assignees: HYUNDAI MOTOR COMPANY, Seoul (KR); Kia Corporation, Seoul (KR)

( * ) Notice: Subject to any disclaimer, the term of this patent is extended or adjusted under 35 U.S.C. 154(b) by 848 days.

(21) Appl. No.: 17/674,293

(22) Filed: Feb. 17, 2022

(65) Prior Publication Data

US 2023/0077813 A1 Mar. 16, 2023

(30) Foreign Application Priority Data

Sep. 16, 2021 (KR) .......................... 10-2021-0124152

(51) Int. Cl.
*G01R 31/3842* (2019.01)
*B60L 58/12* (2019.01)
(Continued)

(52) U.S. Cl.
CPC .......... *G01R 31/3842* (2019.01); *B60L 58/12* (2019.02); *G01R 31/367* (2019.01); *H02J 7/0048* (2020.01)

(58) Field of Classification Search
CPC ... G01R 31/3842; G01R 31/367; B60L 58/12; B60L 58/20; B60L 58/13; B60L 2240/547; H02J 7/0048; Y02T 10/70
(Continued)

(56) References Cited

U.S. PATENT DOCUMENTS

| 7,971,345 B2 * | 7/2011 | Okumura .............. | H01M 10/44 29/730 |
| 8,731,752 B2 * | 5/2014 | Yu .......................... | B60W 20/13 180/65.265 |

(Continued)

FOREIGN PATENT DOCUMENTS

| CN | 105207243 B | * | 2/2018 | ............. Y02E 70/30 |
| EP | 3627173 A1 | * | 3/2020 | ............. G01R 35/04 |

(Continued)

OTHER PUBLICATIONS

Machine Translation of JP 2004249900 A (Year: 2004).*
(Continued)

*Primary Examiner* — M Baye Diao
(74) *Attorney, Agent, or Firm* — MORGAN, LEWIS & BOCKIUS LLP

(57) ABSTRACT

An apparatus for correcting a state of charge (SOC) of a low-voltage battery inside a vehicle and a method for the same are provided. The apparatus includes a storage storing a table having an SOC value corresponding to a charging voltage and a charging time of the low-voltage battery inside the vehicle, a voltage sensor to measure the charging voltage of the low-voltage battery, and a controller to measure the charging time of the low-voltage battery, determine, from the table, the SOC value corresponding to the measured charging time and the measured charging voltage, and correct the SOC value of the low-voltage battery, based on the determined SOC value.

6 Claims, 4 Drawing Sheets

(51) Int. Cl.
  *G01R 31/367* (2019.01)
  *H02J 7/00* (2006.01)
(58) Field of Classification Search
  USPC .......................................................... 320/112
  See application file for complete search history.

(56) References Cited

U.S. PATENT DOCUMENTS

| | | | | |
|---|---|---|---|---|
| 9,797,960 | B2* | 10/2017 | Barrett | G01R 31/3833 |
| 9,857,429 | B2* | 1/2018 | Daiss | G01R 31/3835 |
| 10,365,330 | B2* | 7/2019 | Mayr | G01R 31/389 |
| 10,408,887 | B2* | 9/2019 | Shimizu | G01R 31/392 |
| 10,823,785 | B2* | 11/2020 | Ho | G01R 31/3835 |
| 11,041,913 | B2 | 6/2021 | Choi et al. | |
| 12,024,052 | B2* | 7/2024 | Kim | B60L 3/12 |
| 2007/0090803 | A1* | 4/2007 | Yun | B60L 58/16 |
| | | | | 320/128 |
| 2009/0013521 | A1* | 1/2009 | Okumura | H01M 10/482 |
| | | | | 29/730 |
| 2009/0295333 | A1* | 12/2009 | Ryu | G01R 31/3842 |
| | | | | 320/134 |
| 2013/0204561 | A1* | 8/2013 | Daiss | G01R 31/382 |
| | | | | 702/63 |
| 2015/0084639 | A1* | 3/2015 | Joe | G01R 31/3842 |
| | | | | 324/426 |
| 2017/0028867 | A1* | 2/2017 | Ishishita | H02J 7/00712 |
| 2018/0120385 | A1 | 5/2018 | Choi et al. | |
| 2020/0182937 | A1* | 6/2020 | Wampler, II | B60L 3/12 |
| 2020/0185943 | A1* | 6/2020 | Youn | B60L 58/13 |

FOREIGN PATENT DOCUMENTS

| | | | | | |
|---|---|---|---|---|---|
| EP | 3779484 | A1 | * | 2/2021 | ............ H01M 10/48 |
| JP | 2004249900 | A | * | 9/2004 | ............. Y02T 10/64 |
| JP | 2006340544 | A | * | 12/2006 | ......... Y02T 10/7072 |
| JP | 2007189760 | A | * | 7/2007 | ............. Y02T 10/70 |
| KR | 10-2015-0018187 | A | | 2/2015 | |
| KR | 10-2015-0022110 | A | | 3/2015 | |
| KR | 10-2018-0025745 | A | | 3/2018 | |
| KR | 10-2018-0047768 | A | | 5/2018 | |
| WO | WO-2016063515 | A1 | * | 4/2016 | ............. F02D 29/00 |
| WO | WO-2018025276 | A1 | * | 2/2018 | ............. H01M 10/06 |

OTHER PUBLICATIONS

Machine Translation of JP 2007189760 A (Year: 2007).*
Office Action issued in corresponding Korean Patent Application No. 10-2021-0124152 dated May 8, 2025.
Alexander Farmann et al., "High-voltage Lithium-ion Batteries—Methods for On-board State Estimation", ATZ Elektron Worldwide, vol. 13, 2018, pp. 58-63.

* cited by examiner

APPARATUS FOR CORRECTING STATE OF CHARGE OF LOW-VOLTAGE BATTERY IN VEHICLE AND METHOD FOR THE SAME

CROSS-REFERENCE TO RELATED APPLICATION

This application claims the benefit of priority to Korean Patent Application No. 10-2021-0124152, filed in the Korean Intellectual Property Office on Sep. 16, 2021, the entire contents of which are incorporated herein by reference.

TECHNICAL FIELD

The present disclosure relates to a technology of correcting a state of charge (SOC) of a low-voltage battery to supply power to various electronic devices inside a vehicle.

BACKGROUND

In general, an electric vehicle, which is traveling by driving an electric motor using a high-voltage battery, may include a hybrid electric vehicle (HEV), an electric vehicle (EV), a plug-in hybrid electric vehicle (PHEV), or a fuel cell electric vehicle (FCEV).

Such an electric vehicle includes a high-voltage battery to supply driving power and a low-voltage battery to supply operating power to an internal electric device (an electronic part). A low voltage DC-DC converter (LDC) connected to the low-voltage battery and the electric device reduces (down-converts) a high voltage of the high-voltage battery to a charging voltage of the low-voltage battery to charge the low-battery voltage, when the SOC of the low-voltage battery does not exceed a reference value (for example, 80%).

Such a low-voltage battery supplies the operating power to start the electric vehicle (the preparation for the starting completed), and supplies the operating power to electric devices, such as various lamps, various systems, or electronic control units (ECU).

A lead-acid storage battery has been mainly used as the lower-voltage battery, because the lead-acid storage battery is charged and used again even if the lead-acid storage battery is fully discharged. However, the lead-acid storage battery is heavier, and has a lower charging density (charging efficiency).

Meanwhile, an intelligent battery sensor (IBS) to calculate the SOC of the low-voltage battery provided in the electric vehicle calculates the SOC without considering the charging efficiency of the low-voltage battery. Accordingly, there is a difference between the calculated SOC value of the low-voltage battery and the real SOC value of the low-voltage battery. The difference is increased, as the number of charging the low-voltage battery is increased.

For example, on the assumption that the SOC of the low-voltage battery is 80%, and the charging efficiency ($\eta$) is 0.5, although the SOC of the low-voltage battery, which is calculated by the IBS, is 90% after the low-voltage battery is charged one time, the real SOC of the low-voltage battery becomes 85%. Thereafter, although the SOC of the low-voltage battery, which is calculated by the IBS, is 80% in the state the low-voltage battery is discharged, the real SOC of the low-voltage battery becomes 75%. Thereafter, although the SOC of the low-voltage battery, which is calculated by the IBS, is 90% after the low-voltage battery is secondary charged, the real SOC of the low-voltage battery is 80%.

Therefore, since a conventional technology of calculating the SOC of the low-voltage battery provided in the electric vehicle is to calculate the SOC without considering the charging efficiency of the low-voltage battery, as the number of charging the low-voltage battery is increased, the difference between the calculated SOC of the low-voltage battery and the real SOC of the low-voltage battery is increased.

The matter described in "Background" is made for the convenience of explanation, and may include matters other than a related art well known to those skilled in the art.

SUMMARY

The present disclosure has been made to solve the above-mentioned problems occurring in the prior art while advantages achieved by the prior art are maintained intact.

An aspect of the present disclosure provides an apparatus for correcting an SOC of a low-voltage battery inside a vehicle, capable of reducing the difference between a calculated SOC of the low-voltage battery and a real SOC of the low-voltage battery, by employing a table having an SOC value corresponding to a charging voltage and a charging time of the low-voltage battery, and correcting the SOC of the low-voltage battery, based on the table, whenever the number of charging the low-voltage battery exceeds a reference value, and a method for the same.

The technical problems to be solved by the present disclosure are not limited to the aforementioned problems, and any other technical problems not mentioned herein will be clearly understood from the following description by those skilled in the art to which the present disclosure pertains. In addition, it can be easily understood that the objects and the features of the present disclosure are realized by means and the combination of the means claimed in appended claims.

According to an aspect of the present disclosure, an apparatus for correcting an SOC of a low-voltage battery inside a vehicle may include a storage storing a table having an SOC value corresponding to a charging voltage and a charging time of the low-voltage battery inside the vehicle, a voltage sensor to measure the charging voltage of the low-voltage battery, and a controller to measure the charging time of the low-voltage battery, determine, from the table, the SOC value corresponding to the measured charging time and the measured charging voltage, and correct the SOC value of the low-voltage battery based on the determined SOC value.

According to an embodiment of the present disclosure, the controller may count the number of charging the low-voltage battery and may correct the SOC value of the low-voltage battery, when the number of charging the low-voltage battery exceeds a reference value.

According to an embodiment of the present disclosure, the low-voltage battery may be implemented with a lead-acid storage battery.

According to an embodiment of the present disclosure, the controller may acquire the SOC value of the low-voltage battery, from an intelligent battery sensor (IBS).

According to an aspect of the present disclosure, a method for correcting a state of charge (SOC) of a low-voltage battery inside a vehicle may include storing a table having an SOC value corresponding to a charging voltage and a charging time of the low-voltage battery inside the vehicle, measuring, by a voltage sensor, the charging voltage of the low-voltage battery, measuring, by the controller, the charging time of the low-voltage battery, determining, by the controller, an SOC value corresponding to the measured charging time and the measured charging voltage from the table, and correcting, by the controller, the SOC value of the low-voltage battery based on the determined SOC value.

According to an embodiment of the present disclosure, the method may further include counting the number of charging the low-voltage battery and correcting the SOC value of the low-voltage battery, when the number of charging the low-voltage battery exceeds a reference value.

According to an embodiment of the present disclosure, the method may further include obtaining the SOC value of the low-voltage battery, from an intelligent battery sensor (IBS).

According to another aspect of the present disclosure, an apparatus for correcting a state of charge (SOC) of a low-voltage battery inside a vehicle includes a storage to store a charging efficiency and a nominal capacity of the low-voltage battery inside the vehicle, a current sensor to measure a charging current of the low-voltage battery, and a controller to calculate the SOC value of the low-voltage battery based on the charging efficiency, the nominal capacity, and the charging current of the low-voltage battery and correct the SOC value of the low-voltage battery by based on the calculated SOC value.

$$SOC_{new} = SOC_{old} + \frac{\int (I \times \eta)dt}{NC}$$

According to another embodiment of the present disclosure, the charging efficiency may be varied based on at least one of an internal temperature, a charging voltage, or a charging current of the low-voltage battery.

According to another embodiment of the present disclosure, the controller may count the number of charging the low-voltage battery and may correct the SOC value of the low-voltage battery, when the number of charging the low-voltage battery exceeds a reference value.

According to another embodiment of the present disclosure, the low-voltage battery may be implemented with a lead-acid storage battery.

According to another embodiment of the present disclosure, the controller may acquire the SOC value of the low-voltage battery, from an intelligent battery sensor (IBS).

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
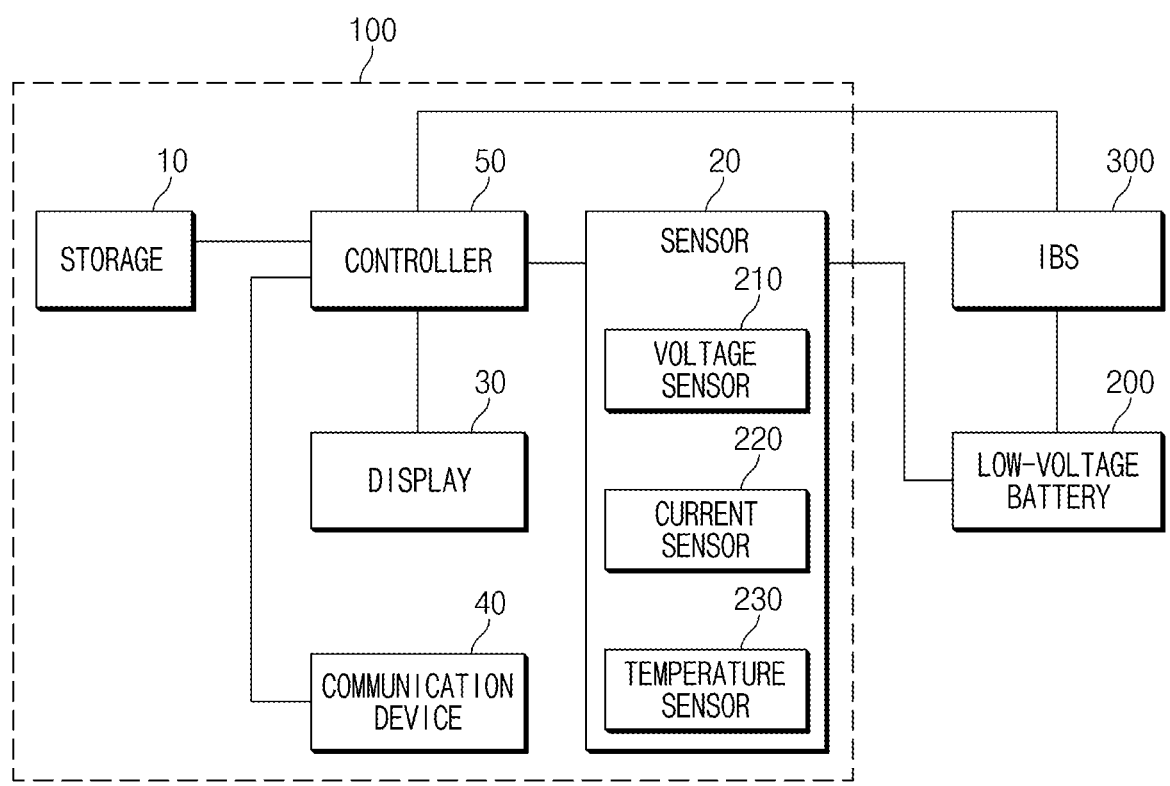
FIG. 1 is a view illustrating the configuration of an apparatus for correcting an SOC of a low-voltage battery inside a vehicle, according to an embodiment of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In addition, in the following description of components according to an embodiment of the present disclosure, the terms 'first', 'second', 'B', '(a)', and '(b)' may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a flowchart illustrating a method for correcting an SOC of a low-voltage battery inside a vehicle, according to an embodiment of the present disclosure.

As illustrated in FIG. 1, according to an embodiment of the present disclosure, an apparatus 100 for correcting an SOC of the low-voltage battery inside a vehicle may include a storage 10, a sensor 20, a display 30, a communication device 40, and a controller 50. In this case, according to an embodiment of the present disclosure, the components may be combined into each other to be implemented in one form, or some components may be omitted, depending on the manners of reproducing the apparatus 100 for correcting the SOC of the low-voltage battery inside the vehicle, according to an embodiment of the present disclosure.

Regarding the components, the storage 10 may store a table having an SOC value corresponding to a charging voltage and a charging time of a low-voltage battery 200 inside a vehicle. For example, the table is as in following table 1.

TABLE 1

|  | Charging time (6 hours) | Charging time (3 hours) |
|---|---|---|
| Charging voltage (14.8 V) | 95% | 93% |
| Charging voltage (14.4 V) | 93% | 90% |

Although table 1 illustrates four cases for the illustrative purpose, the number of cases may be varied depending on the intention of a designer. In particular, table 1 may be substituted with a graph having a horizontal axis, which represents a charging voltage (in the range from the minimum charging voltage to the maximum charging voltage), and a vertical axis which represents a charging time (in the range from the minimum charging time to the maximum charging time).

The storage 10 may store various logics, various algorithms, and various programs required in the process of correcting the SOC of the low-voltage battery, based on the table whenever the number of charging the low-voltage battery 200 inside the vehicle exceeds a reference value.

The storage 10 may store '10' as the reference value, and the reference value may be varied depending on the intention of a designer.

The storage 10 may store the charging efficiency and a nominal capacity of the low-voltage battery 200.

The storage 10 may include at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The sensor 20 may include a voltage sensor 210, which measures a voltage (hereinafter, a charging voltage) supplied to charge the low-voltage battery 200, a current sensor 220, which measures a current supplied to charge the low-voltage battery 200, and a temperature sensor 230 which measures an internal temperature of the low-voltage battery 200.

The display 30 may display the SOC value of the low-voltage battery 200, which is corrected by the controller 50.

The communication device 40 may transmit, to the server, the SOC value of the low-voltage battery 200, which is corrected by the controller 50.

The communication device 40 may include at least one of a mobile communication module, a wireless Internet module, or a short-range wireless communication module.

The mobile communication module may make communication with a server over a mobile communication network constructed depending on technology standards or communication schemes for mobile communication. For example, the technology standards or communication schemes for mobile communication may include Global System for Mobile communication (GSM), Code Division Multi Access (CDMA), Code Division Multi Access 2000 (CDMA 2000), Enhanced Voice-Data Optimized or Enhanced Voice-Data Only (EV-DO), Wideband CDMA (WCDMA), High Speed Downlink Packet Access (HSDPA), High Speed Uplink Packet Access (HSUPA), Long Term Evolution (LTE), or Long Term Evolution-Advanced (LTEA).

The wireless Internet module, which is a module for wireless Internet access, may make communication with the server through Wireless LAN (WLAN), Wireless-Fidelity (Wi-Fi), Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), or Long Term Evolution-Advanced (LTE-A).

The short-range communication module may support short-range communication with the server through at least one of Bluetooth™, Radio Frequency Identification (RFID), Infrared Data Association (IrDA), Ultra Wideband (UWB), ZigBee, Near Field Communication (NFC), or Wireless Universal Serial Bus (USB).

The controller 50 may perform the overall control such that the components normally perform the respective functions. In addition, the controller 50 may be implemented in the form of hardware or software, and may be implemented in the form of the combination of the hardware and the software. Preferably, the controller 50 may be implemented with a micro-processor, but the present disclosure is not limited thereto.

The controller 50 may perform various control operations in the process of correcting the SOC of the low-voltage battery 200 inside the vehicle, based on the table, whenever the number of charging the low-voltage battery 200 inside the vehicle exceeds the reference value. In this case, the low-voltage battery 200 may include a lead-acid storage battery.

Hereinafter, the operation of the controller 50 will be described in detail.

The controller 50 may correct the SOC of the low-voltage battery 200, which is calculated by the IBS 300. For example, the controller 50 may correct the SOC of the low-voltage battery 200, which is calculated by the IBS 300, based on the table stored in the storage 10. For example, when the SOC value stored in the table is 90%, and the SOC of the low-voltage battery 200, which is calculated by the IBS 300, is 85%, the controller 50 may correct 85% to 90%.

The controller 50 may count the number of charging the low-voltage battery 200 and may correct the SOC of the low-voltage battery 200 whenever the number of charging the low-voltage battery 200 exceeds the reference value (for example, 10). In other words, the controller 50 may correct the SOC of the low-voltage battery 200 in the cycle of 10 times.

For example, when the charging of the low-voltage battery 200 is completed in tenth charging, the SOC of the low-voltage battery 200, which is calculated by the IBS 300, is corrected. When the charging of the low-voltage battery 200 is completed in 20th charging, the SOC of the low-voltage battery 200, which is calculated by the IBS 300, is corrected.

As described above, the SOC of the low-voltage battery 200, which is calculated by the IBS 300, is periodically corrected, thereby preventing the resources of the controller 50 from being wasted while reducing the difference made between the calculated SOC of the low-voltage battery 200 and the real SOC of the low-voltage battery 200.

According to another embodiment, the controller 50 directly calculates the SOC of the low-voltage battery 200, based on the charging efficiency of the low-voltage battery 200, and may correct the SOC of the low-voltage battery 200, which is calculated by the IBS 300, using the directly calculated SOC.

The controller 50 may calculate the SOC of the low-voltage battery 200 based on following Equation 1.

$$SOC_{new} = SOC_{old} + \frac{\int (I \times \eta) dt}{NC} \quad \text{Equation 1}$$

In Equation 1, 'I' denotes a charging current, 'η' denotes a charging efficiency of the low-voltage battery 200, and 'NC' denotes a nominal capacity. In this case, the charging efficiency may be varied depending on the internal temperature, the charging voltage, and the charging current of the low-voltage battery 200.

The controller 50 may calculate the SOC of the low-voltage battery 200 based on Equation 1 during the charging of the low-voltage battery 200.

Figure 2:
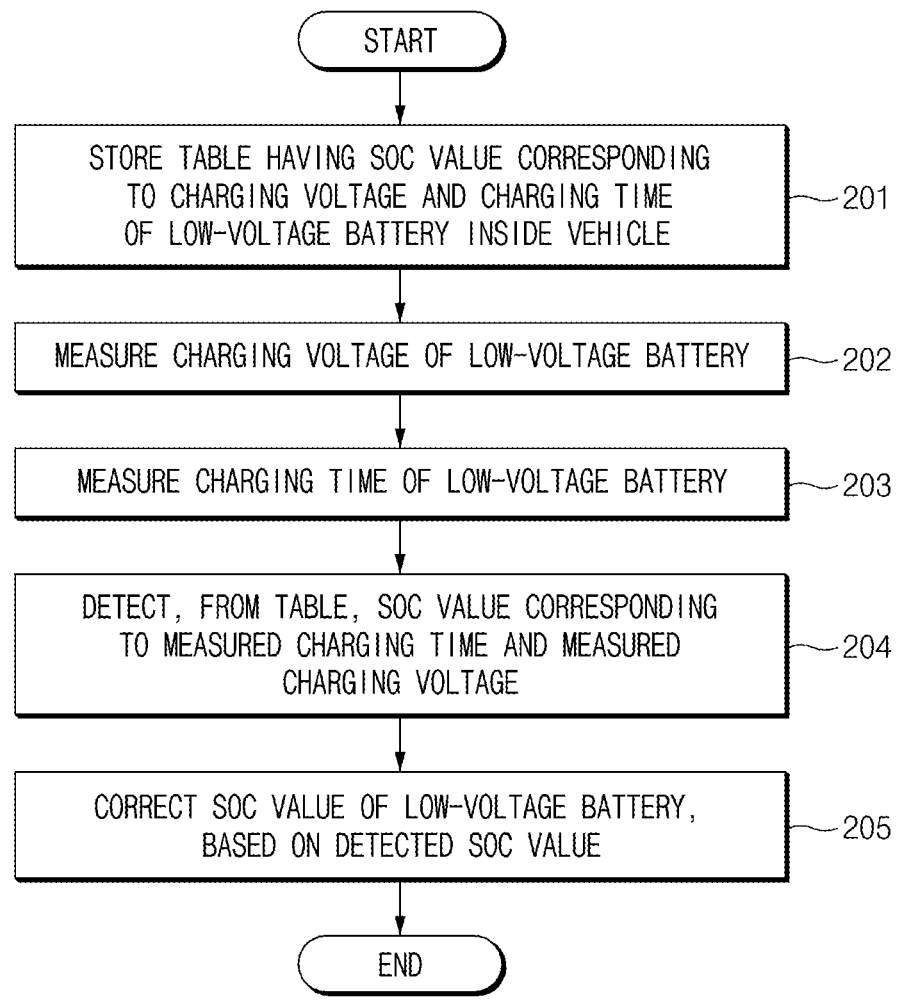
FIG. 2 is a flowchart illustrating a method for correcting an SOC of a low-voltage battery inside a vehicle, according to an embodiment of the present disclosure.

FIG. 2 is a flowchart illustrating a method for correcting an SOC of a low-voltage battery inside a vehicle, according to an embodiment of the present disclosure.

First, the storage 10 stores a table having an SOC value corresponding to a charging voltage and a charging time of the low-voltage battery 200 inside the vehicle (201)

Thereafter, the voltage sensor 210 measures the charging voltage of the low-voltage battery 200 (202).

Thereafter, the controller 50 measures the charging time of the low-voltage battery 200 (203).

Next, the controller 50 detects, from the table, the SOC value corresponding to the measured charging time and the measured charging voltage (204).

Then, the controller 50 corrects the SOC value of the low-voltage battery 200, based on the detected SOC value (205). The controller 50 may count the number of charging the low-voltage battery 200 and may correct the SOC value of the low-voltage battery 200 whenever the number of charging the low-voltage battery 200 exceeds the reference value.

Figure 3:
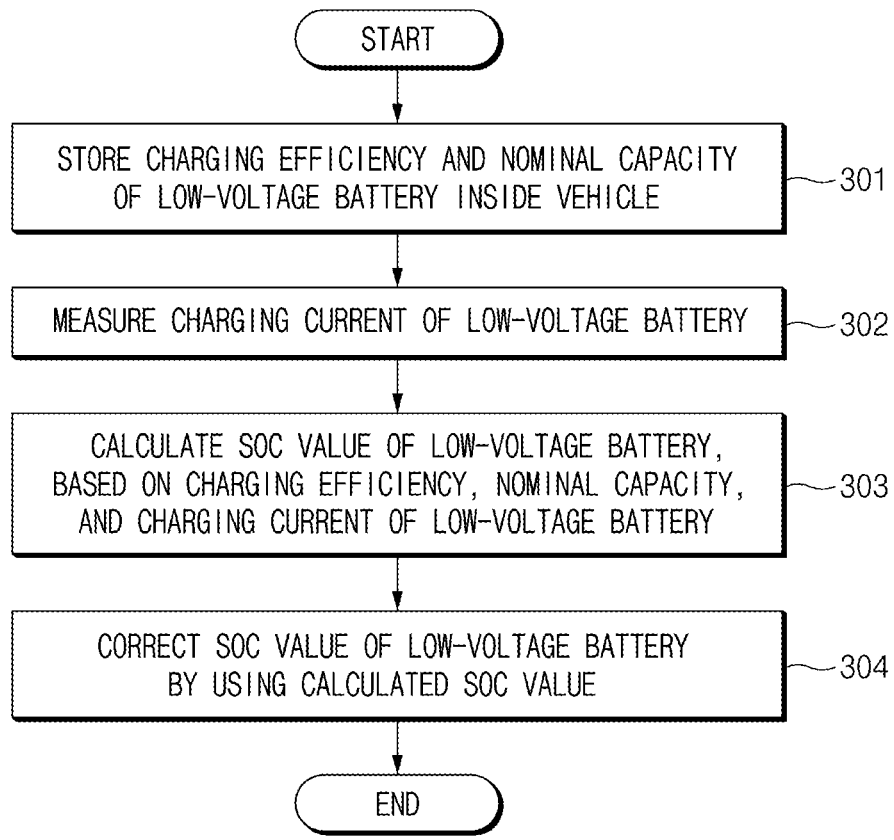
FIG. 3 is a flowchart illustrating a method for correcting an SOC of a low-voltage battery inside a vehicle, according to another embodiment of the present disclosure.

FIG. 3 is a flowchart illustrating a method for correcting an SOC of a low-voltage battery inside a vehicle, according to another embodiment of the present disclosure.

First, the storage 10 stores a charging efficiency and a nominal capacity of the low-voltage battery 200 inside the vehicle (301).

Thereafter, the controller 220 measures the charging current of the low-voltage battery 200 (302).

Thereafter, the controller 50 calculates the SOC value of the low-voltage battery 200, based on the charging efficiency, the nominal capacity, and the charging current of the low-voltage battery 200 (303).

Thereafter, the controller 50 corrects the SOC value of the low-voltage battery 200 by using the calculated SOC value (304). In this case, the controller 50 may count the number of charging the low-voltage battery 200 and may correct the SOC value of the low-voltage battery 200, whenever the number of charging the low-voltage battery 200 exceeds the reference value.

Figure 4:
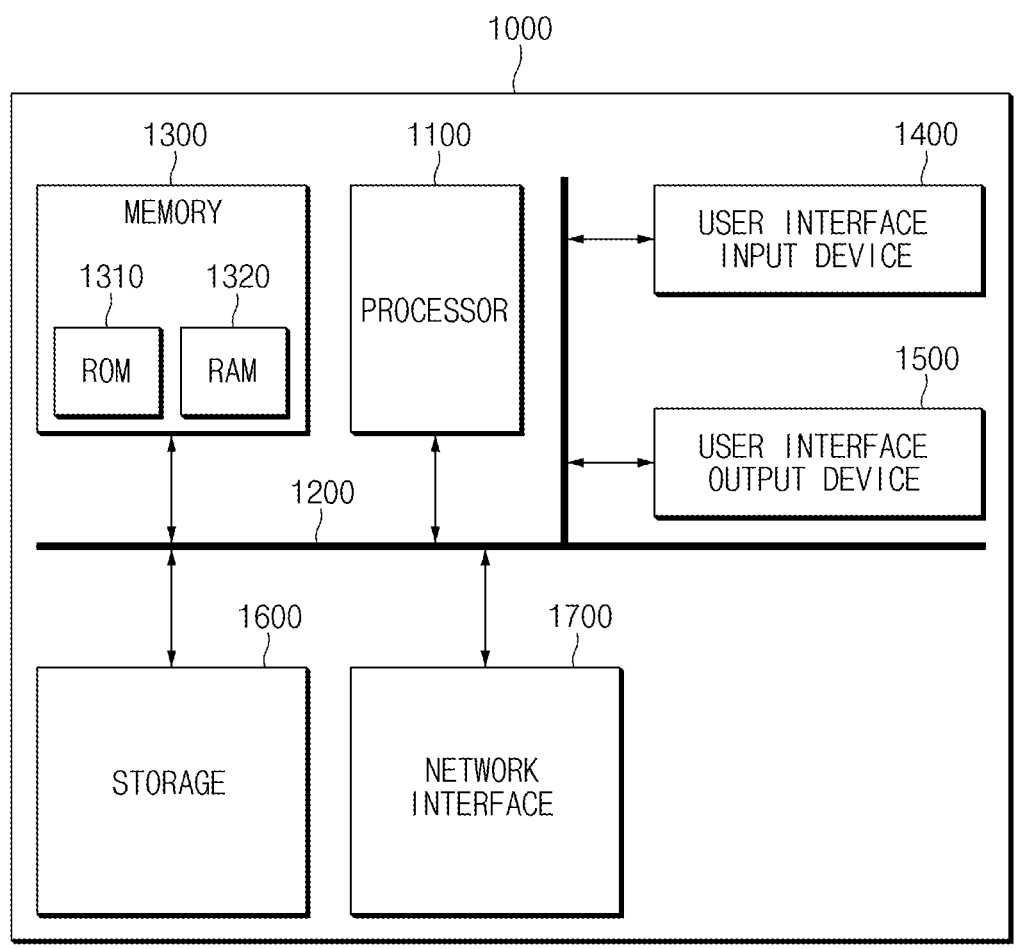
FIG. 4 is a block diagram illustrating a computing system to execute a method for correcting an SOC of a low-voltage battery inside a vehicle, according to an embodiment of the present disclosure.

FIG. 4 is a block diagram illustrating a computing system to execute the method for correcting the SOC of the low-voltage battery inside the vehicle, according to an embodiment of the present disclosure.

Referring to FIG. 4, according to an embodiment of the present disclosure, the method for correcting the SOC of the low-voltage battery inside the vehicle may be implemented through the computing system. A computing system 1000 may include at least one processor 1100, a memory 1300, a user interface input device 1400, a user interface output device 1500, a storage 1600, and a network interface 1700, which are connected with each other via a system bus 1200.

The processor 1100 may be a central processing unit (CPU) or a semiconductor device for processing instructions stored in the memory 1300 and/or the storage 1600. Each of the memory 1300 and the storage 1600 may include various types of volatile or non-volatile storage media. For example, the memory 1300 may include a read only ROM 1310 and a RAM 1320.

Thus, the operations of the methods or algorithms described in connection with the embodiments disclosed in the present disclosure may be directly implemented with a hardware module, a software module, or the combinations thereof, executed by the processor 1100. The software module may reside on a storage medium (i.e., the memory 1300 and/or the storage 1600), such as a RAM memory, a flash memory, a ROM, memory an erasable and programmable ROM (EPROM), an electrically EPROM (EEPROM), a register, a hard disc, a solid state drive (SSD), a removable disc, or a compact disc-ROM (CD-ROM). The exemplary storage medium may be coupled to the processor 1100. The processor 1100 may read out information from the storage medium and may write information in the storage medium. Alternatively, the storage medium may be integrated with the processor 1100. The processor and storage medium may reside in an application specific integrated circuit (ASIC). The ASIC may reside in a user terminal. Alternatively, the processor and storage medium may reside as separate components of the user terminal.

As described above, according to an embodiment of the present disclosure, in the apparatus for correcting an SOC of the low-voltage battery inside the vehicle and the method for the same, the difference between a calculated SOC of the low-voltage battery and a real SOC of the low-voltage battery may be reduced by employing a table having an SOC value corresponding to a charging voltage and a charging time of the low-voltage battery, and correcting the SOC of the low-voltage battery, based on the table, whenever the number of charging the low-voltage battery exceeds a reference value, and a method for the same.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the embodiments of the present disclosure are provided to explain the spirit and scope of the present disclosure, but not to limit them, so that the spirit and scope of the present disclosure is not limited by the embodiments. The scope of protection of the present disclosure should be construed by the attached claims, and all equivalents thereof should be construed as being included within the scope of the present disclosure.

What is claimed is:

1. An apparatus for correcting a state of charge (SOC) of a low-voltage battery inside a vehicle, the apparatus comprising:
   a storage storing a table having an SOC value corresponding to a charging voltage and a charging time of the low-voltage battery inside the vehicle;
   a voltage sensor configured to measure the charging voltage of the low-voltage battery; and
   a controller configured to:
   measure the charging time of the low-voltage battery,
   determine, from the table, the SOC value corresponding to the measured charging time and the measured charging voltage, and
   correct the SOC value of the low-voltage battery, based on the determined SOC value,
   wherein the controller is further configured to:
     count the number of charging the low-voltage battery; and
     correct the SOC value of the low-voltage battery, when the number of charging the low-voltage battery exceeds a reference value.

2. The apparatus of claim 1, wherein the low-voltage battery is implemented with a lead-acid storage battery.

3. The apparatus of claim 1, wherein the controller is further configured to:
   acquire the SOC value of the low-voltage battery, from an intelligent battery sensor (IBS).

4. A method for correcting a state of charge (SOC) of a low-voltage battery inside a vehicle, the method comprising:
   storing a table having an SOC value corresponding to a charging voltage and a charging time of the low-voltage battery inside the vehicle;
   measuring, by a voltage sensor, the charging voltage of the low-voltage battery;
   measuring, by the controller, the charging time of the low-voltage battery;

determining, by the controller, the SOC value corresponding to the measured charging time and the measured charging voltage from the table; and correcting, by the controller, the SOC value of the low-voltage battery, based on the determined SOC value, wherein the correcting of the SOC value of the low-voltage battery includes:

counting the number of charging the low-voltage battery; and correcting the SOC value of the low-voltage battery, when the number of charging the low-voltage battery exceeds a reference value.

5. The method of claim 4, wherein the low-voltage battery includes a lead-acid storage battery.

6. The method of claim 4, wherein the correcting of the SOC value of the low-voltage battery includes:

acquiring the SOC value of the low-voltage battery, from an intelligent battery sensor (IBS).

* * * * *